March 5, 1963  E. P. KENNEDY  3,080,028
SYNCHRONIZED TRANSMISSION MECHANISM
Filed Oct. 13, 1958  2 Sheets-Sheet 1

INVENTOR.
Everett P. Kennedy.
BY Edwin C. McRae
John R. Faulkner
and Donald J. Harrington
ATTORNEYS.

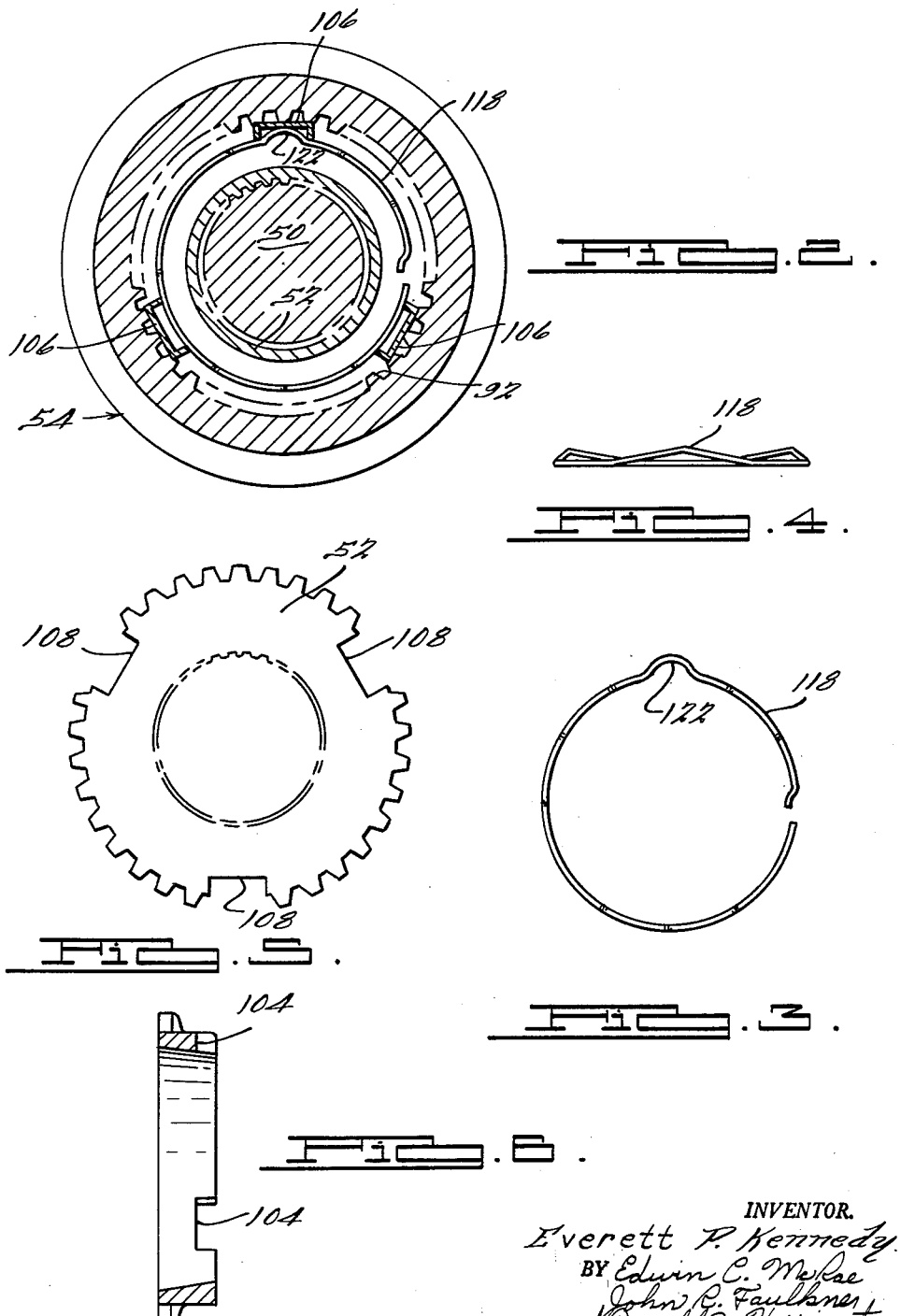

3,080,028
SYNCHRONIZED TRANSMISSION MECHANISM

Everett P. Kennedy, Detroit, Mich., assignor to Ford Motor Company, Dearborn, Mich., a corporation of Delaware Filed Oct. 13, 1958, Ser. No. 766,851
5 Claims. (Cl. 192—53)

My invention relates generally to multiple speed power transmission mechanisms and more particularly to a power transmission mechanism with a gear synchronizer means for facilitating a shift from one transmission speed ratio to a relatively lower speed ratio.

The improvement of my instant invention is adapted to be applied to manually operated automotive power transmission mechanisms in which some of the power transmitting gear elements are disposed about a mainshaft arranged concentrically with respect to the power input shaft, and wherein a cooperating cluster gear assembly is mounted for rotation about a countershaft disposed in parallel relationship relative to the mainshaft. During operation the cluster gear assembly is continuously driven by the power input portion of the mechanism and one element of the cluster gear assembly is in continuous meshing engagement with a first gear element rotatably mounted about the axis of the mainshaft. A synchronizer mechanism is used to selectively couple the above-mentioned first gear element to the mainshaft or to couple the mainshaft to the power input portion of the mechanism thereby providing either direct drive or a so-called intermediate speed ratio. A second gear element, hereinafter referred to as the low and reverse gear, is carried by the mainshaft and it may be manually moved in an axial direction into engagement with another element of the cluster gear assembly when the synchronizer mechanism assumes a neutral condition thereby effecting a so-called low speed ratio. Finally, reverse drive may be accomplished by means of a reverse idler gear drivably connected to a reverse gear element of the cluster gear assembly, the above-mentioned low and reverse gear of the mainshaft being selectively engageable with the reverse idler gear to complete a reverse drive power flow path from the engine to the transmission tailshaft.

A driver operated main clutch of the friction type is interposed between the engine crankshaft and the power input portion of the transmission mechanism, and changes in the above-described gear ratios can be effected when the main clutch is disengaged thereby momentarily interrupting the power delivery path.

When it is desired to condition the mechanism for low speed ratio operation, it has heretofore been necessary in mechanisms of this type to delay movement of the low and reverse gear into the low speed ratio position after the main clutch is disengaged until rotation of the cluster gear assembly has been sufficiently retarded. As previously indicated, the cluster gear assembly is continuously driven whenever the main clutch is engaged, and the inertia of the main clutch disc and the cluster gear elements causes the cluster gear assembly to rotate for several seconds following disengagement of the main clutch, and the low and reverse gear cannot be shifted into the low speed position during this time interval without causing a considerable amount of undesirable gear clashing. This same condition exists during a shift into reverse since the low and reverse gear cannot be smoothly shifted into engagement with the reverse idler gear while the reverse idler gear and the cluster gear assembly are rotating at a substantial speed.

I have successfully overcome this problem by providing a means for retarding the motion of the cluster gear elements after the main clutch is disengaged prior to a shift into the low speed ratio, and I have thereby considerably reduced the time interval required to accomplish a shift into low or reverse.

The provision of an improved power transmission mechanism of the type above described being a principal object of my invention, it is a further object of my invention to provide a power transmission mechanism having a cluster gear assembly situated in parallel relationship with respect to the mainshaft and having a retarding means for retarding the motion of the cluster gear assembly following disengagement of the main transmission clutch.

It is a further object of my invention to provide a manually controlled multiple speed power transmission mechanism wherein a shift from a relatively high speed ratio to a lower speed ratio may be accomplished with maximum degree of smoothness and without clashing of the transmission gear elements.

It is a further object of my invention to provide a manually controlled multiple speed power transmission mechanism wherein a shift into a reverse driving ratio may be accomplished with a maximum degree of smoothness and without clashing of the transmission gear elements.

It is a further object of my invention to provide a transmission mechanism of the type above set forth wherein a synchronizer mechanism is employed for selectively clutching the transmission mainshaft to either an intermediate speed gear element or to the power input portions of the mechanism.

It is a further object of my invention to provide a transmission mechanism as above set forth wherein the means for retarding the motion of the cluster gear assembly is situated in combination with and defined by the synchronizer mechanism.

It is a further object of my invention to provide a transmission mechanism of the type above set forth wherein the cluster gear motion retarding means may be readily adapted for use in a variety of synchronized transmission gear arrangements.

Further objects and features of my invention will readily become apparent from the following description and from the accompanying drawings wherein:

FIGURE 2 is a transverse cross sectional view of the synchronizer mechanism associated with the gear arrangement of FIGURE 1 and is taken along section line 2—2 of FIGURE 1;

FIGURE 3 is a detailed view of a synchronizer expansion ring for use in the synchronizer mechanism of FIGURES 1 and 2;

FIGURE 4 is an end view of the expansion spring of FIGURE 3;

FIGURE 5 is an end view of the hub member of the synchronizer mechanism of FIGURES 1 and 2; and FIGURE 6 is a cross sectional view of a synchronizer blocker ring which forms a portion of the synchronizer mechanism of FIGURES 1 and 2.

Figure 1:
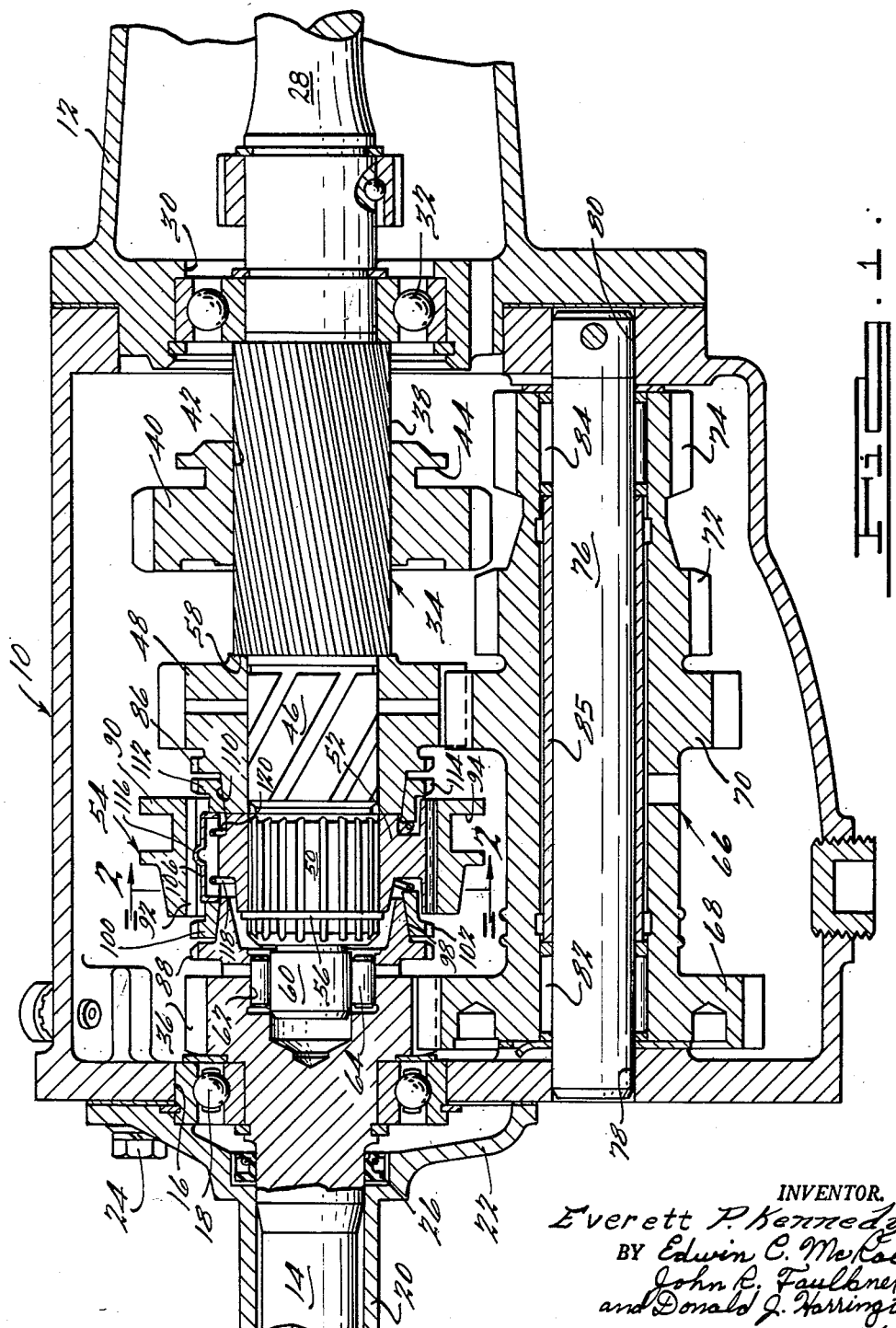
FIGURE 1 shows a longitudinal cross sectional view of a multiple speed synchronized gear transmission mechanism capable of accommodating the improvement of my instant invention.

Referring first to FIGURE 1, the transmission main casing is identified by numeral 10 and a rearwardly extending tailshaft housing is shown at 12, the casing 10 and housing 12 being joined together in a suitable fashion by means of bolts, not shown. The casing 10 defines an enclosure for the gear elements of the transmission and it may be suitably mounted on a main transmission friction disc clutch housing in a conventional fashion.

The power input shaft is identified by numeral 14 and it is drivably connected to the engine crankshaft by the abovementioned main transmission clutch. The shaft 14 is rotatably journaled in an opening 16 formed in casing 10 by means of bearing 18. A bearing retainer for the main clutch disc assembly is shown at 20 and it includes a radially extending portion 22 which may be bolted to the front of the casing 10 by suitable bolts 24. A seal is provided between shaft 14 and retainer 20 as shown at 26.

The transmission tailshaft is identified by numeral 28 and it is rotatably journaled in an opening 30 formed in the tailshaft housing 12, a suitable bearing 32 being provided for this purpose. The tailshaft 28 forms an extension of the transmission mainshaft which is generally identified by numeral 34.

The power input shaft 14 carries a power input gear 36 which, by preference, is formed integrally therewith. The mainshaft 34 is formed with a helical spline portion 38 on which a low and reverse sliding gear 40 is mounted. The gear 40 is formed with a cylindrical internally splined opening 42 and is adapted to move in either axial direction on splined portion 38. This adjustment may be accomplished by means of a conventional shifter fork having finger portions adapted to engage a peripheral groove 44 formed on the gear 40.

Mainshaft 34 is also formed with a grooved bearing portion 46 on which an intermediate gear 48 is rotatably mounted, the gear 48 being formed with a suitable bearing opening for receiving the mainshaft portion 34. Mainshaft 34 is also provided with an externally splined portion 50 on which an internally splined hub member 52 is carried, the hub member 52 forming a portion of a synchronizer mechanism generally identified by numeral 54. A snap ring or other suitable retainer means is provided at 56 in order to maintain the hub member 52 and intermediate gear 48 in properly assembled relationship, the gear 48 being adapted to engage a shoulder 58 formed on mainshaft 34 at the juncture of portions 38 and 46.

The end of mainshaft 34 is formed with a bearing portion 60 of relatively reduced diameter and this portion 60 is received within a suitable bearing opening 62 formed in the adjacent end of power input shaft 14. A bearing 64 is provided for rotatably supporting the mainshaft portion 60 within the opening 62.

A cluster gear assembly is generally indicated at 66 and it includes a first gear element 68 which is in constant engagement with gear 36. Assembly 66 further includes a second gear element 70 which is in constant meshing engagement with intermediate gear 48. A third gear element 72 and a fourth gear element 74 are included in the cluster gear assembly 66 and each of the gear elements 68, 70, 72 and 74 form individual parts of the cluster gear assembly 66 and are adapted for conjoint rotation.

The cluster gear assembly 66 is formed with an internal opening and a countershaft 76 is received through the opening as indicated. Countershaft 76 is end supported in cooperating openings 78 and 80 formed in the transmission casing 10. Spaced bearings 82 and 84 are provided between countershaft 76 and cluster gear assembly 66 for rotatably mounting the latter and a spacer 85 is situated between the bearings 82 and 84.

Intermediate gear 48 is formed with an extended hub on which is formed external clutch teeth 86. Similarly, gear 36 is formed with an elongated hub and external clutch teeth 88 are formed thereon as shown. The clutch teeth 86 and 88 form a portion of the synchronizer mechanism 54.

Mechanism 54 further includes an intermediate and high speed clutch sleeve 90 which is internally splined to the abovementioned externally splined hub 52, the internally splined teeth being designated by numeral 92. Sleeve 90 is adapted for axial movement along the axis of mainshaft 34 but it is otherwise positively connected to mainshaft 34 by means of hub 52.

When synchronizer clutch sleeve 90 is shifted in a forward or left-hand direction as viewed in FIGURE 1, clutch teeth 92 may become drivably engaged with teeth 88 formed on the hub of gear 36 thereby establishing a direct drive connection between power input shaft 14 and mainshaft 34. This direct drive relationship may be referred to as the high speed ratio. In a similar fashion when synchronizer clutch sleeve 90 is shifted in a rearward or right-hand direction as viewed in FIGURE 1, teeth 92 become drivably engaged with teeth 86 formed on the hub of intermediate gear 48 thereby establishing a positive driving connection between gear 48 and the mainshaft 34. A power delivery path is thereby established by gear 36, gear element 68, gear element 70, gear 48, clutch teeth 86, sleeve 90 and hub 52, and this driving relationship may be referred to as the intermediate speed ratio.

The synchronizer sleeve 90 is formed with an annular groove 94 which is adapted to receive the fingers of a shifter fork which in turn may be actuated by means of a conventional shift linkage mechanism, not shown.

The hub of gear 36 is formed with a conical clutch surface 98 and a synchronizer blocker ring is disposed about the clutch surface 98 in adjacent relationship with respect to teeth 88, the blocker ring being identified by numeral 100. The radially inward periphery of blocker ring 100 is formed with a conical clutch surface which cooperates with the abovementioned clutch surface 98 and the outer periphery thereof is formed with clutch teeth 102. As best seen in FIGURE 6, blocker ring 100 is formed with spaced recesses 104 situated on one axial side thereof and an insert or thrust bar 106 is disposed within each recess 104. The thrust bars 106 are in turn situated within spaced slots or radial recesses 108 formed in the periphery of hub 52. As best seen in FIGURE 5, the slots 108 are angularly situated 120° apart.

The thrust bars 106 may be formed by means of a stamping operation and they are provided with thrust shoulders engageable with the blocker ring 100. The circumferential width of the recesses 104 is greater than the width of the thrust bars 106 so that a limited amount of lost motion may occur between the blocker ring 100 and the hub 52.

The hub of intermediate gear 48 is also formed with a conical clutch surface, as shown at 110, and a second blocker ring 112 cooperates therewith as shown. Blocker ring 112 is also formed with an internal cone clutch surface adapted to engage clutch surface 110 and it also includes external blocker teeth 114 disposed adjacent clutch teeth 86. The thrust bars 106 are also adapted to engage the blocker ring 112 as indicated, and they are situated within cooperating recesses which correspond to recesses 104 formed in blocker ring 100. In a similar fashion the recesses in blocker ring 112 are greater in width than the width of the thrust bars 106 thereby permitting a limited degree of lost motion between blocker ring 112 and hub 52.

A detent projection 116 is formed on each of the thrust bars 106 and they are adapted to be received in a cooperating groove formed in the internal clutch teeth 92. The thrust bars 106 are urged radially outward by expansion springs 118 and 120 thereby normally urging the detent projection 116 into engagement with a cooperating groove formed in clutch sleeve 90.

For the purpose of more fully describing the springs 118 and 120, I have illustrated spring 118 in more particular detail in FIGURES 2, 3 and 4.

The spring 118 is of the open end type and is formed with an offset portion 122 which is received within one of the thrust bars 106. Each of the thrust bars 106 is engaged by separate portions of the spring 118 and urged radially outward. Spring 118 is also deformed in an axial direction as indicated in FIGURE 4 so that it has three high points which are engageable with the adjacent blocker ring 100 when the spring is assembled. It is therefore capable of exerting an axial force on the blocker ring 102 as well as a radial force on the thrust bars 106. In a similar fashion spring 120 exerts a radially outward force on thrust bars 106.

During operation of the transmission structure above described, the low and reverse sliding gear 40 may be shifted in a left-hand direction as viewed in FIGURE 1 to cause meshing engagement between gear 40 and gear element 72. Such a shift should be initiated when the vehicle is stationary and the transmission main clutch is disengaged. When the main clutch is subsequently engaged, the transmission mechanism is conditioned for operation in the low speed ratio and the power flow path comprises gear 36, gear element 68, gear element 72 and gear 40.

To effect a shift from the low speed ratio to the intermediate speed ratio after the vehicle is under motion, the main transmission clutch is disengaged and the low and reverse sliding gear 40 is moved to the neutral position shown in FIGURE 1. The clutch sleeve 90 is subsequently urged in a right-hand direction as viewed in FIGURE 1, and this causes an axial pressure to be exerted on blocker ring 112 by reason of the detent effect provided by the projection 116 on the thrust bars 106 and the springs 118 and 120. This axial pressure causes axial engagement between blocker ring 112 and clutch surface 110 thereby imparting a driving torque to intermediate gear 48. This tends to decelerate gear 48 until it reaches synchronism with mainshaft 34. Until a synchronized condition is reached, the lost motion between blocker ring 112 and thrust bars 106 causes a misalignment between clutch teeth 92 and teeth 114 thereby preventing a shifting movement of the sleeve 90 in a right-hand direction into engagement with teeth 86. However, after a synchronized condition is obtained, the teeth 92 will be aligned with teeth 114 thereby permitting the sleeve 90 to be shifted over blocker ring 112 so that it may engage the teeth 86 to establish a driving connection between mainshaft 34 and intermediate gear 48. After the transmission main clutch is again re-engaged the transmission is conditioned for intermediate speed ratio operation.

To effect a shift from the intermediate speed ratio to the direct drive speed ratio, the sleeve 90 is shifted in a left-hand direction and an axial pressure is exerted on blocker ring 100 by the thrust bars 106. Again, this thrust is obtained by reason of the detent effect provided by projection 116 on thrust bars 106 and springs 118 and 120. The lost motion between blocker ring 100 and thrust bars 106 causes misalignment of teeth 92 and 88 and prevents a shifting movement of sleeve 90 in the left-hand direction until the speed of gear 36 is synchronized with the speed of mainshaft 34. Torque is supplied to gear 36 by reason of the friction connection between blocker ring 100 and clutch surface 98.

After the gear 36 is brought into synchronism with mainshaft 34, the clutch teeth 92 are brought into alignment with clutch teeth 102 so that sleeve 90 may be shifted over blocker ring 100 into clutching engagement with clutch teeth 88. It is thus apparent that the shift from the low speed ratio to the intermediate speed ratio, the shift from the intermediate speed ratio to the high speed ratio and the shift from the high speed ratio to the intermediate speed ratio will be characterized by a high degree of smoothness.

To effect reverse drive operation the clutch sleeve 90 is adjusted to the neutral position shown in FIGURE 1 and the transmission main clutch is disengaged. The sliding gear 40 is then shifted in a right-hand direction as viewed in FIGURE 1 until it is brought into engagement with a reverse idler gear, not shown. This reverse idler gear in turn drivably engages reverse gear element 74 formed on the clutch gear assembly 66. It is therefore apparent that a reverse motion will be imparted to the mainshaft under these conditions.

As previously indicated, the cluster gear assembly 66 is continuously driven whenever the transmission mainshaft is engaged while the engine is running. When it is desired to shift the sliding gear 40 into the low speed ratio position or the reverse driving speed ratio position the transmission main clutch is disengaged but it is necessary to delay the shift until the speed of rotation of the cluster gear assembly is sufficiently reduced. After rotation is reduced or has terminated, gear 40 may be moved axially in a left-hand direction so that gear 40 will engage gear element 72. The clutch sleeve 90 assumes the neutral position shown in FIGURE 1 during such a shift of the gear 40 into the low speed position. The axial pressure applied to blocker ring 100 by the spring 118 causes a limited degree of frictional engagement between the blocker ring 100 and the cone clutch surface 98. Since the mainshaft 46 is held stationary during such a shift, the modified clutching engagement between blocker ring 100 and the gear 36 will cause the gear 36 and the associated cluster gear assembly 66, as well as the rotating clutch disc of the main transmission clutch, to decelerate. It is thus apparent that the time required to overcome the inertia forces of these components will be considerably reduced so that the total time required to accomplish a shift into the low speed ratio or into the reverse driving speed ratio will be substantially reduced. This will eliminate the undesirable gear clashing which is normally associated with such shifts and will substantially simplify the shifting sequence.

Having thus described a preferred embodiment of my invention, what I claim and desire to secure by U.S. Letters Patent is:

1. Synchronizer clutch means for selectively clutching a first rotary member to a second rotary member and to a third rotary member, said synchronizer clutch means including friction clutch elements engageable with said second rotary member and said third rotary member, an externally splined synchronizer hub carried by said first rotary member, radial recesses formed in said hub, a separate thrust bar disposed in each recess, an internally splined sleeve drivably carried by said hub and adapted to slide axially relative thereto, external clutch teeth formed on each of said second and third rotary members, a spring detent connection between said sleeve and each of said thrust bars, said detent connection being adapted to transfer an axial thrust to said friction clutch elements, and an expansion spring encircling said first rotary member, said spring being adapted to urge said thrust bars radially outward into cooperating engagement with said sleeve, said spring being formed with an axial deformation and engageable with one of said friction clutch elements whereby a clutch energizing force is applied to the latter when said synchronizer clutch means assumes a neutral, released condition.

2. A synchronizer clutch means for use with a power transmission mechanism having a power input shaft, a mainshaft, and a gear journaled about said mainshaft, said synchronizer clutch means including friction clutch elements engageable with said power input shaft and said gear, an externally splined synchronizer hub carried by said mainshaft, radial recesses formed in said hub, a separate thrust bar disposed in each recess, an internally splined sleeve drivably carried by said hub and adapted to slide axially relative thereto, external clutch teeth formed on said gear and said power input shaft, a spring detent connection between said sleeve and each of said thrust bars, said detent connection being adapted to transfer an axial thrust to said friction clutch elements, and an expansion spring encircling said mainshaft and urging said thrust bars radially outward into engagement with said sleeve, said spring having axial deformations engageable with the friction clutch element for said power input shaft whereby a clutch energizing force is applied to said last mentioned clutch element when said synchronizer clutch means assumes a neutral, released condition to retard relative motion between said power input shaft and said mainshaft.

3. A synchronizer clutch means for establishing a driving connection between a first rotary member and a second rotary member, said clutch means including an externally splined hub carried by said second rotary member, an internally splined sleeve slidably carried by said hub, a clutch element connected to said first rotary member and adapted to rotate conjointly therewith, said clutch element having external teeth formed thereon, a friction clutch surface formed on said clutch element, a blocker ring interposed between said hub and the teeth formed on said clutch element, a friction clutch surface formed on said blocker ring, spring means for normally biasing said blocker ring in an axial direction to effect a modified engagement of said clutch surface when said sleeve assumes a clutch released position whereby the relative motion of said first and second rotary members is retarded, said synchronizer clutch means further including a plurality of thrust bars, said hub being recessed on the periphery thereof to accommodate said thrust bars, said blocker ring being recessed to receive said thrust bars whereby a driving connection between said blocker ring and said hub is established, a detent connection between said thrust bars and said sleeve, said spring means comprising an expansion spring adapted to urge normally said thrust bars in a radially outward direction, said spring having axially displaced portions for applying an axial thrust on said blocker ring in addition to a radial force on said thrust bars.

4. A synchronizer clutch means for establishing a driving connection between a first driving member and a second driving member including an externally splined hub carried by said second driving member, an internally splined sleeve slidably carried by said hub, a clutch element connected to said power input shaft and adapted to rotate conjointly therewith, said clutch element having external clutch teeth formed thereon, a first clutch surface formed on said clutch element, a blocker ring interposed between said hub and the teeth on said clutch element, a driving connection between said blocker ring and said hub with means for providing a limited angular lost motion therebetween, a friction clutch surface formed on said blocker ring, said synchronizer clutch means further including a plurality of thrust bars, said hub being recessed in the periphery thereof to accommodate said thrust bars, a detent connection between said thrust bars and said sleeve, an expansion spring adapted to urge normally said thrust bars in a radially outward direction, said spring having axially displaced portions engageable with said blocker ring and adapted to apply a longitudinal thrust on said blocker ring in addition to a radial force on said thrust bars, said spring normally biasing said blocker ring in an axial direction to effect a modified engagement of said clutch surface when said sleeve assumes a clutch release position whereby the relative motion of said first and second driving members is retarded.

5. The combination as set forth in claim 4 wherein said blocker rings are formed with axially extending recesses, said thrust bars being adapted to extend into said recesses, the circumferential width of said recesses being greater than the corresponding width of said thrust bars.

References Cited in the file of this patent

UNITED STATES PATENTS

| | | |
|---|---|---|
| 2,221,893 | White | Nov. 19, 1940 |
| 2,221,900 | White et al. | Nov. 19, 1940 |
| 2,248,134 | Snow | July 8, 1941 |
| 2,259,527 | Manville | Oct. 21, 1941 |
| 2,339,969 | White | Jan. 25, 1944 |
| 2,359,982 | Flinn | Oct. 10, 1944 |
| 2,435,929 | Plexico | Feb. 10, 1948 |
| 2,619,210 | Voigt | Nov. 25, 1952 |

FOREIGN PATENTS

| | | |
|---|---|---|
| 554,048 | Italy | Jan. 5, 1957 |